United States Patent [19]

Ström et al.

[11] Patent Number: 4,920,649
[45] Date of Patent: May 1, 1990

[54] ARRANGEMENT IN A CHAIN SAW

[75] Inventors: Hans I. Ström, Kode; Ulf J. G. Petersson, Floda, both of Sweden

[73] Assignee: Aktiebolaget Electrolux, Stockholm, Sweden

[21] Appl. No.: 311,723

[22] Filed: Feb. 16, 1989

[30] Foreign Application Priority Data

Feb. 24, 1988 [SE] Sweden .................. 8800626

[51] Int. Cl.$^5$ .................. B23D 59/00; H02N 7/00
[52] U.S. Cl. .................. 30/382; 318/116
[58] Field of Search .................. 30/144, 153, 286, 314, 30/381–387; 318/116; 361/207; 200/61.45 R, 61.45 M

[56] References Cited

U.S. PATENT DOCUMENTS

| 3,447,051 | 5/1969 | Attwood et al. | 318/116 |
| 3,889,166 | 6/1975 | Scurlock | 318/116 |
| 3,968,386 | 7/1976 | Heinzi | 318/116 |
| 4,152,833 | 5/1979 | Phillips . | |
| 4,402,138 | 9/1983 | Glockle et al. | 30/382 |
| 4,432,139 | 2/1984 | Komler er al. | 30/382 |
| 4,656,985 | 4/1987 | Andreasson et al. | 30/382 |
| 4,757,881 | 7/1988 | Jonsson et al. | 30/382 |

FOREIGN PATENT DOCUMENTS

| 2265146 | 10/1976 | Fed. Rep. of Germany . |
| 2621812 | 12/1976 | Fed. Rep. of Germany . |
| 7195483 | 9/1976 | Sweden . |
| 8526888 | 3/1985 | Sweden . |

Primary Examiner—Douglas D. Watts
Assistant Examiner—Paul M. Heyrana
Attorney, Agent, or Firm—Pearne, Gordon, McCoy & Granger

[57] ABSTRACT

When kick-backs occur on chain saws the cutter bar (36) is subjected to heavy forces, especially in the longitudinal direction. By putting in a piezo-electric crystal (37) at the cutter bar attachment in a place where the forces occur at kick-backs it can be effected that the crystal generates an electric impulse at sudden force changes, while the normally imposed screw powers do not give any signal. In this way it is possible to let the crystal trigger a mechanism (15) which releases the chain brake (14, 15) in an electrical way.

5 Claims, 2 Drawing Sheets

ARRANGEMENT IN A CHAIN SAW

BACKGROUND OF THE INVENTION

The present invention relates to a kick-back detector in a chain saw provided with a chain brake which is released to avoid accidents when a kick-back occurs. The release of the chain brake stops any further movement of the cutting chain.

It is known in the art how to arrange a chain brake and a connected release mechanism so that the cutting chain is brought to a standstill during the early phase of a kick-back. Through the Swedish patent specification SE-A-8502688-8 (corresponding to U.S. Pat No. 4,757,881, granted July 19, 1988) it is known how to arrange a chain brake which is releasable by means of an electrically controlled release mechanism in which a charging circuit of a capacitor and a first switch is in series connected to the ignition generator of the saw, and a discharging circuit of the capacitor and a second switch are connected to an electromagnet holding a locking device of the release mechanism. In order to utilize such a control circuit to the brake in the best possible way it is required that a kick-back detector sense the kick-back movement with the least possible inertia and immediately send impulses to the control circuit thereby releasing the brake mechanism and stopping the cutting chain.

SUMMARY OF THE INVENTION

The invention is a mechanism having a piezo-electric crystal for detecting kick-back characterized by a superior kick-back detection ability and consequently by an early release pulse generation. The piezo-electric crystal is located near the base of the cutter bar of the chain saw close to the brake. When kick-backs occur the cutter bar is subjected to heavy forces, especially in its longitudinal direction. The piezo-electric crystal is located where there are substantial forces exerted during kick-backs. During such force exertions, the piezo-electric crystal detects the kick-back and generates an electric pulse which is sent to and acts as a release impulse in the control circuit of the brake. The advantages of such a mechanism are as follows:

The crystal selectivly detects forces in a single direction.

The force in the longitudinal direction of the cutter bar appears early during kick-backs.

The crystal only detects changes in force.

It is an inexpensive and reliable component.

BRIEF DESCRIPTION OF THE DRAWINGS

An embodiment of the invention will be described in the following with reference to the drawings attached showing in FIG. 1 a vertical projection of a chain saw brake and a chain tension mechanism in cross-section, FIG. 2 a horizontal cross-section along the line II-II in FIG. 1, FIG. 3 an electric wiring diagram for the control circuit of the chain saw brake.

DESCRIPTION OF THE PREFERRED EMBODIMENT

Figure 1:
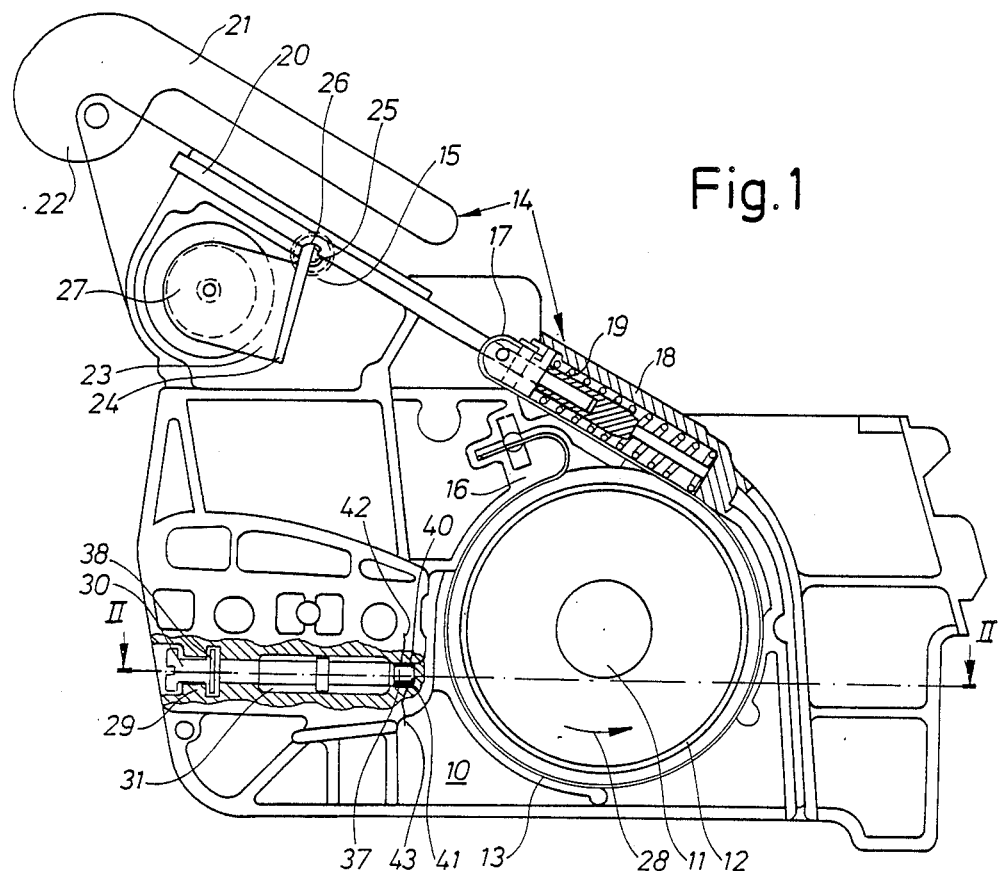

The brake mechanism is located in a cover 10 of the chain saw housing. FIG. 1 shows the inside of the cover 10. An engine shaft 11 with a clutch drum 12 on the shaft 11 are schematically shown in the position they are in when the cover 10 is mounted on the saw body. The brake mainly comprises a brake band 13, a locking device 14 and a trigger 15. The brake band 13 is fastened at one end by a locking member 16 to the cover 10 and at the other end to guide 17 which is movable in a cylinder 18. The locking device 14 comprises a helical spring 19 within the cylinder 18, a bar 20 on which the guide 17 is attached and a handle 21 and an eccentric 22 which displaces the bar against the spring 19 by a swinging motion. The trigger 15 is of a special kind for attaining a fast and safe release of the brake. It consists of a ring-shaped permanent magnet 23, with angularly extending poles secured in the cover 10 and an armature 24 in the form of a swingable rod on a shaft 25, one end of which (somewhat tapered) projects into a recess 26 of the bar 20 when the rod armature 24 is pulled to the magnet 23. The magnetic power is sufficient to resist the spring force on the bar 20, so the spring remains in the locked (shown) position. The brake band 13 is then loosely positioned around the drum 12 which therefore can rotate freely.

On the magnet 23 there is also an electromagnetic coil 27 eliminating the magnetic field when energized, whereby the armature 24 is free and turns around the shaft 25. The spring 19 then immediately pushes the bar 20 and consequently the guide 17 towards the eccentric 22, thus tensioning the brake band 13 around the clutch drum 12 which is then stopped. The braking force is increased by means of a servo action created when the brake band 13 is tensioned in the same direction as the clutch drum 12 rotates (arrow 28).

Figure 2:
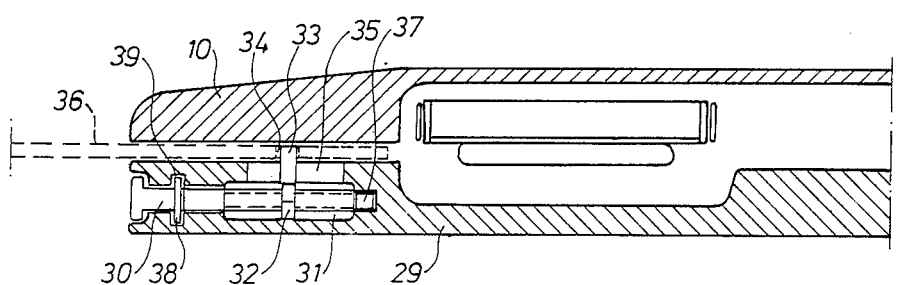

The mechanism thus described is known by the aforesaid specification No. 8502688-8 and is here used as an example of a brake in which the embodiment of the invention can be used. The following addresses the kick-back detector mentioned in the Background of the Invention which generates the release impulse by which the brake is put into operation. In FIG. 2 a horizontal cross-section of the cover 10 as well as a crankcase end wall 29 of the chain saw engine are shown. Usually chain saws are provided with a screw 30 for adjusting the tension in the cutting chain. The screw 30 is countersunk in a hole 31 in the crankcase end wall 29 as shown in FIG. 1 and FIG. 2. On the screw 30 there is a nut 32 with a projecting lug 33 which is inserted into a hole 34 in the cutter bar 36. When rotating the screw 30, the nut 32 and the projecting lug 33 are moved along a groove 35 of the wall 29, and the cutter bar 36, which is loosely inserted between the cover 10 and the end wall 29, moves accordingly in its longitudinal direction. The inner end of the screw 30 then abuts a piece of crystal 37 having a piezo-electric effect. The crystal 37 makes contact to the bottom of the hole 31. The screw 30 has an elastic flange 38 introduced into a circular groove 39 thus preventing the screw 30 from moving within the hole 31. The crystal 37 is surrounded on two sides by metallic plates 40 and 41 from which electric wires 42 and 43 extend.

The interaction between the screw 30 and the cutter bar 36 is such that shocks arising during kick-backs on the cutter bar 36 are transmitted to the crystal 37 which normally is squeezed between the screw end and the hole bottom. When the crystal 37 is compressed by such a shock, a voltage arises between the plates 40 and 41 which is transmitted on the wires 42 and 43. The circuits in which this voltage is introduced are shown in FIG. 3.

Figure 3:
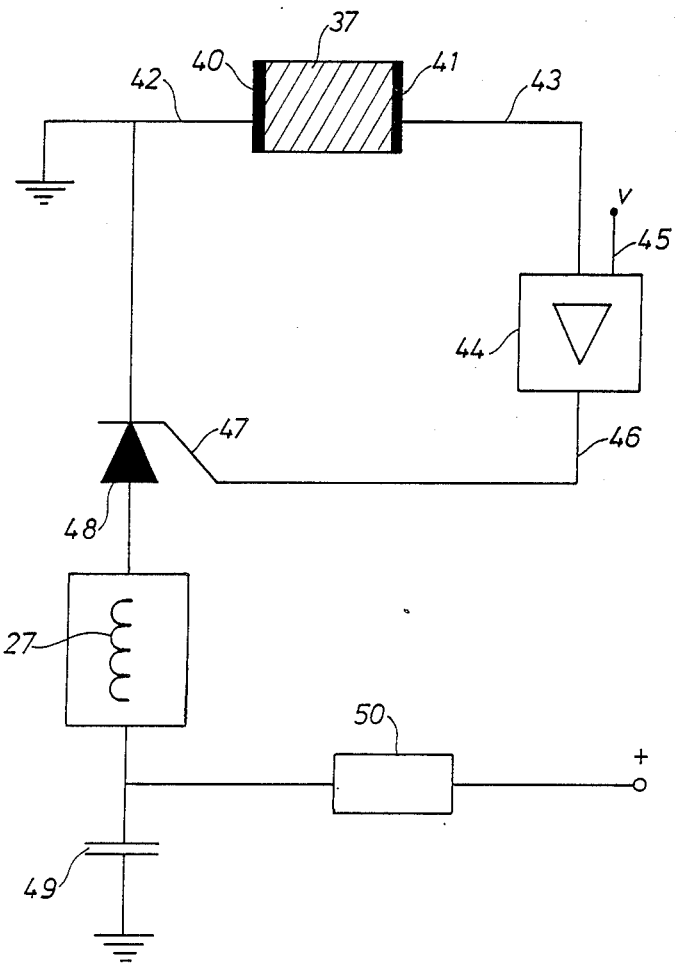

The wires 42 and 43 in the circuit as shown in FIG. 3 are connected to the metallic plates 40 and 42. Wire 43 transmits the voltage generated by the piezo-crystal 37 to a comparator 44 which also receives a reference voltage V on a wire 45. If the voltage of the piezo-crystal 37 on the wire 43 exceeds V a signal is transmitted on the outlet 46 of the comparator 44 to the control electrode 47 of a thyristor 48. The thyristor 48 is connected between the coil 27 and the metallic plates 40 and 41 and controls the current which, neutralizes the magnetic field in the permanent magnet 23. A capacitor 49 constitutes a current source for the current through the coil 27 and the thyristor 48 and is charged during normal operation of the saw from the generator via a resistance 50. In order to make the brake operate as described before it is only needed to get a signal from the crystal 37 when a kick-back has occurred on the saw. Then the thyristor 48 is made conductive and the capacitor 49 is discharged through the magnet coil 27 resulting in an immediate brake operation.

The mechanism described shall only be considered one embodiment of how the invention can be realized, it can, e.g., be applied to several different brakes. The preferred location of the crystal piece under the end of the setting screw is one of possible choices and shall not be considered as limiting the scope of the invention which is completely defined in the following claims.

We claim:

1. In a chain saw having:
   a body;
   a cutter bar connected to the body for carrying a cutting chain;
   a cockable cutting chain brake releasable by means of an electromagnetically controlled release mechanism (15), and
   an electrical system, the improvement comprising:
   (a) an amplifier and an input circuit therefor provided in the release mechanism, said input circuit including a piezo-electric crystal (37) positioned near the base of the cutter bar where the cutter bar is fastened to the saw body, said piezo-electric crystal generating a voltage when substantial forces are exerted on the cutter bar during a kick-back, the voltage being transmitted as a release impulse to said amplifier, said amplifier also being supplied a reference voltage from the electrical system of the chain saw, the output of said amplifier activating said release mechanism to cause release of said chain brake as a result of said kick-back.

2. In a chain saw as recited in claim 1, wherein the piezo-electric crystal (37) is inserted between a setting screw (30) and a stop in the saw body, the stop located adjacent to the end of said setting screw (30) located within said body.

3. In a chain saw as recited in claim 2, wherein the cutter bar and the setting screw lie in substantially the same longitudinal direction.

4. In a chain saw as recited in claim 1, wherein said amplifier is comprised of a thyristor, an electromagnetic coil (27), and a capacitor (49), said amplifier constituting a control circuit of the release mechanism.

5. In a chain saw as recited in claim 4, wherein said capacitor has a charging circuit and a discharging circuit, said discharging circuit comprising said electromagnetic coil and said thyristor.

* * * * *